United States Patent [19]
Van Niekerk

[11] Patent Number: 5,904,751
[45] Date of Patent: May 18, 1999

[54] SEPARATION APPARATUS

[75] Inventor: Erasmus Van Niekerk, Courcerault, France

[73] Assignee: North Star Technologies Ltd., Jersey, United Kingdom

[21] Appl. No.: 08/751,821

[22] Filed: Nov. 19, 1996

[30] Foreign Application Priority Data

| Nov. 20, 1995 | [ZA] | South Africa | 95/9836 |
| Apr. 25, 1996 | [ZA] | South Africa | 96/3312 |
| Oct. 24, 1996 | [ZA] | South Africa | 96/8950 |

[51] Int. Cl.⁶ ............ B01D 24/12; B01D 46/00; B01D 46/30
[52] U.S. Cl. ............ 95/212; 95/267; 95/288; 96/230; 96/290; 55/385.1; 55/520; 55/DIG. 36
[58] Field of Search ............ 55/222, 233, 234, 55/268, 383, 385.1, 520, 525, DIG. 18, DIG. 36; 95/195–197, 210–213, 267, 287, 288; 96/230, 290

[56] References Cited

U.S. PATENT DOCUMENTS

| 1,941,928 | 1/1934 | Bradford, Jr. | 55/520 X |
| 2,065,781 | 12/1936 | Rehfus | 183/45 |
| 2,122,582 | 7/1938 | Norris | 55/520 X |
| 2,135,703 | 11/1938 | Fenske | 55/525 |
| 2,580,703 | 1/1952 | Russell | 55/520 X |
| 3,151,187 | 9/1964 | Comte | 55/233 X |
| 3,165,387 | 1/1965 | Place | 95/211 |
| 3,324,630 | 6/1967 | Teller et al. | 95/211 |
| 3,370,401 | 2/1968 | Lucas | 95/211 |
| 3,409,279 | 11/1968 | Metrailer | 95/211 |
| 3,810,348 | 5/1974 | Byers et al. | 95/212 |
| 3,957,464 | 5/1976 | Teller | 95/196 |
| 4,124,021 | 11/1978 | Molitor | 55/222 |
| 4,261,718 | 4/1981 | Garner | 55/520 |
| 4,270,936 | 6/1981 | Mann | 55/520 |
| 4,277,263 | 7/1981 | Bergeron | 55/282 |
| 4,316,726 | 2/1982 | Hopper | 95/287 X |
| 4,323,373 | 4/1982 | Fritz | 95/281 |
| 4,364,754 | 12/1982 | Diachuk | 55/222 X |
| 4,460,552 | 7/1984 | Zakrzewski | 95/211 X |
| 4,499,033 | 2/1985 | Huffman | 55/520 X |
| 5,069,197 | 12/1991 | Wisting | 126/299 E |
| 5,171,557 | 12/1992 | Crosbie et al. | 95/210 X |
| 5,358,540 | 10/1994 | Tsan-Yun et al. | 55/233 X |
| 5,359,990 | 11/1994 | Hsu | 55/233 X |

FOREIGN PATENT DOCUMENTS

| 007385 | 2/1980 | European Pat. Off. . |  |
| 0 774 290 A1 | 5/1997 | European Pat. Off. . |  |
| 2720201 | 11/1978 | Germany . |  |
| 43 36 100 C1 | 11/1994 | Germany . |  |
| 4427074 A1 | 2/1996 | Germany . |  |
| 0680868 | 10/1952 | United Kingdom | 95/210 |
| 0888823 | 2/1960 | United Kingdom . |  |
| 2 109 700 | 6/1983 | United Kingdom . |  |
| WO 86/07545 | 12/1986 | WIPO . |  |
| WO 91/17813 | 11/1991 | WIPO . |  |
| WO 95/11410 | 4/1995 | WIPO . |  |

*Primary Examiner*—Robert Spitzer
*Attorney, Agent, or Firm*—Marshall, O'Toole, Gerstein, Murray & Borun

[57] ABSTRACT

A separation process comprises passing a gas or vapor stream contaminated with an undesired substance or contaminant downwardly through a bed of curled separating media. The undesired substance or contaminant is allowed to separate from the gas or vapor as it passes through the bed. Purified gas or vapor is withdrawn from the bed.

11 Claims, 6 Drawing Sheets

SEPARATION APPARATUS

FIELD OF THE INVENTION

THIS INVENTION relates to separation apparatus. It relates also to a separation process, and to a cooking installation.

SUMMARY OF THE INVENTION

According to a first aspect of the invention, there is provided a separation process, which comprises passing a gas or vapour stream contaminated with an undesired substance or contaminant downwardly through a bed of curled separating media;

allowing the undesired substance or contaminant to separate from the gas or vapour as it passes through the bed; and withdrawing purified gas or vapour from the bed.

The bed may be located in a separation zone having a gas/vapour inlet and a gas/vapour outlet, with the bed positioned between the inlet and the outlet. The gas or vapour stream may enter the separation zone and pass through the bed at a relatively high velocity ($V_1$), with its velocity decreasing to a lower value ($V_2$) on exiting the bed and prior to passing through the outlet. Thus, typically, $V_1$ may be between 2 and 10 m/s, while $V_2$ is preferably less than 2 m/s. The ratio of $V_1:V_2$ may thus be between 5:1 and 1:1. The Applicant believes that the decreased velocity of the gas or vapour stream as it passes through the bed, enhances separation of the contaminant from the gas or vapour.

The process may include allowing excess undesired substance or contaminant to drip from the separating media, and catching this excess undesired substance or contaminant at the bottom of the separation zone.

The process may also include passing the gas or vapour stream from the separation zone through a scrubber for removing an undesired substance such as ammonia therefrom, and/or passing it through a biological filter for removal of a substance such as sulphur therefrom, before discharging the treated gas or vapour stream to atmosphere.

The gas or vapour stream may be at an elevated temperature at which the undesired substance or contaminant is in condensible vaporized form. The process may then include, prior to passing the contaminated gas or vapour stream through the curled separating media bed, cooling the hot gas or vapour stream immediately ahead of the curled separating media bed, with condensed contaminant or undesired substance thus separating from the gas or vapour stream as it passes through the bed.

The cooling of the hot contaminated gas or vapour stream may be effected by directly contacting the hot gas or vapour stream with a cooling medium. The cooling medium may be at between −30° C. and ambient temperature, eg at between −15° C. and 10° C.

In one embodiment of the invention, the cooling medium may comprise a gas or vapour stream. The process may thus comprise admixing the hot gas or vapour stream with a coolant gas or vapour stream, to form a mixed gas or vapour stream, which is then passed downwardly through the bed of curled separating media.

The coolant gas or vapour stream is thus used to control the temperature of the gas or vapour stream passing through the bed of curled separating media. The process may then include regulating the flow rate of the coolant gas or vapour stream, in response to the temperature and flow rate of the hot gas or vapour stream, to control the temperature of the cooled mixed gas or vapour stream. Thus, the temperature of the hot gas or vapour stream typically will be in the range 40° C.–180° C., eg from 80° C.–100° C., with the desired temperature of the mixed gas or vapour stream typically being 15° C.–60° C., such as between 30° C. and 50° C., eg about 40° C.; hence, sufficient coolant gas or vapour will be admixed, by means of the coolant gas or vapour stream, with the hot gas or vapour stream to control the mixed gas or vapour stream temperature at the desired temperature or within the desired temperature range.

Instead, the cooling medium may comprise a coolant liquid. The process may then include spraying the coolant liquid into the hot gas or vapour stream. The spraying may be effected continuously or intermittently.

Both the gas or vapour cooling and the liquid cooling may be used, if desired. Thus, the mixed gas or vapour stream may then be subjected to the liquid spraying, if necessary or desired.

The process may also include, when the pressure drop through the media bed becomes excessive due to contamination of the media and/or solids build-up in the bed, displacing the bed so that the gas or vapour stream enters a different zone of the bed. Thus, the bed may have an entry zone or portion through which the contaminated gas or vapour stream enters the bed and an exit zone or portion through which the purified gas or vapour stream leaves the bed, with the zones being located on opposite sides of a rotational axis, and with the displacement of the bed being through 180° and being effected by rotating it about the axis so that the entry zone becomes the exit zone and the exit zone becomes the entry zone.

The process may include, in a cleaning cycle, washing the curled separating media bed after it has been displaced, to clean or regenerate the media and to improve gas or vapour flow through the bed.

The washing may include spraying hot washing liquid, eg wash water, onto the bed, while continuing to pass the gas or vapour stream through the bed. The washing liquid may include a washing aid, eg a detergent, to assist in cleaning of the media. The process may include collecting, for a period of time, the washing liquid passing through the bed; recycling the washing liquid, ie re-using it for the spraying onto the media bed; and dumping the washing liquid after the period of time, ie at the end of the cleaning cycle.

The contaminated gas or vapour stream may be an off or waste gas stream emanating from a household, commercial or industrial cooker. Thus, the gas or vapour is then air, while the contaminant or undesired substance is then fat and/or oil. The air may be hot as hereinbefore described, in which case the fat and/or oil is present therein in condensible vaporized form. The coolant gas or vapour stream, when present, may thus be cooler air, eg atmospheric air or coolant air, not contaminated with such fat or oil. The coolant liquid, when present, may be water.

The Applicant has found that, apart from the curled separating media acting to remove condensed or liquid contaminants, they also act to remove solid contaminants. Without wishing to be found by theory, the Applicant believes that this may be due to localized cyclone actions taking place within the bed of curled separating media.

According to a second aspect of the invention, there is provided a separation apparatus, which comprises a vessel defining a separation zone;

a contaminated gas/vapour inlet leading into the vessel;

a gas/vapour outlet leading from the vessel;

separating means comprising a bed of curled separating media in the separation zone, the inlet, the separating means and the outlet arranged such that a contaminated gas or vapour stream entering the separation zone through the inlet passes downwardly through the bed and exits the zone through the outlet, with the curled separating media acting to separate contaminants from the gas or vapour as the gas or vapour stream passes through the bed.

The vessel may have a base or floor, a roof spaced from the base, and a peripheral wall between the base and the roof. The relative dimensions of the inlet and the vessel may be such that a reduction in gas or vapour stream velocity as it enters the separation zone, takes place.

In one embodiment of the invention, the inlet may be provided in the roof, with the outlet being provided in the wall. The separation means may then include an apertured basket in the vessel below the air inlet, with the separation media contained in the basket as a fixed bed. A baffle may separate the inlet from the outlet, with the baffle depending from the vessel roof and terminating with clearance from the vessel floor. Thus, gas or vapour will pass downwardly through the bed of separating media, underneath the baffle, and upwardly through the space between the baffle and the vessel wall, to exit through the outlet.

The apparatus may include a contaminant collection zone inside the vessel adjacent the floor such that it is spaced from the bed of curled separating media. In another embodiment of the invention, the inlet may then be provided in the wall at a high level, with the outlet being provided in the wall and/or in the roof such that it is in communication with the space between the bed of curled separating media and contaminant collection zone.

In a first version of this embodiment of the invention, the floor and roof may then be square or rectangular in plan view, with the wall thus comprising four wall panels connecting the floor and the roof, the inlet being provided in one wall panel at said high level and the outlet being provided in an opposed wall panel at a lower level.

In a second version of this embodiment of the invention, the floor and roof may then be square or rectangular in plan view, so that the wall comprises four wall panels connecting the floor and the roof, with one of the inlets being provided in each of two opposing wall panels, and with one of the beds of the curled separating media being provided for each inlet. A common outlet may then be provided in the roof. The floor may be of V-shape in cross-section, tapering downwardly inwardly from the wall panels having the inlets and with the contaminant collection zone being provided at or along the apex of the floor.

Gas/vapour deflection surface(s) may be provided opposite the inlet(s) for deflecting gas or vapour downwardly towards the bed(s). The deflection surface(s) may be curved. In the first version of the invention, the deflection surface may be provided by the roof panel and a portion of that wall panel in which the outlet is located. In the second version of the invention, the deflection surfaces may be provided by additional panels spaced from the wall panels in which the inlets are located, and the roof panel.

The inlet(s) may extend the full length of the wall panel(s), while the outlet may likewise extend the full length of the wall panel or the roof.

In yet another embodiment of the invention, the inlet may lead into the vessel at a high level, with the outlet being located centrally so that the bed of curled separating media is located around the outlet.

The wall may then be cylindrical. In particular, the wall may then be circular in cross-section so that the floor is circular in plan view. The floor may be of concave-shape or dish-shape curving downwardly and inwardly from the cylindrical wall to a lowermost centre point.

The outlet may comprise a cylindrical, eg circular in cross-section, component located centrally within the vessel such that a lower end of the component is spaced with clearance from the floor, and an upper end thereof protrudes beyond the upper end of the wall. A circumferential flange may protrude radially outwardly from the upper end, or an upper end portion, of the cylindrical component. In use, the flange can be used to attach the apparatus to a ceiling, cooking hood, or the like. Circumferentially spaced connecting means, eg brackets, may thus connect the cylindrical component to the wall.

The inlet may thus be defined between the flange and the upper end of the wall. Thus, the inlet will extend peripherally or circumferentially around the vessel.

The flange and upper end portion of the cylindrical component may be shaped to provide a gas or vapour deflecting surface for deflecting gas or vapour entering through the inlet downwardly towards the bed of separating media.

The bed of separating media is thus located between the wall and cylindrical component, and extends around the component. The bed is then thus also of cylindrical form.

The apparatus may include cooling means for cooling a gas or vapour stream immediately before it passes into the bed of separating media. The apparatus may then include a gas/vapour chamber between the inlet and the separating media bed.

The cooling means may be adapted to cool the gas or vapour stream directly. The cooling means may comprise a cooling gas/vapour inlet leading into the gas/vapour chamber. The cooling gas/vapour inlet may comprise a coolant gas/vapour opening in the vessel, and a displaceable closure for controlling the quantity of coolant gas/vapour passing through the opening. Displacement means for the closure, such as an electric motor and lead screw arrangement, may also be provided.

Instead, or additionally, the cooling means may comprise cooling liquid injection means for injecting a cooling liquid, such as cooling water, into the gas/vapour chamber. The injection means may comprise a plurality of nozzles for spraying cooling liquid into the chamber immediately above the media bed, the nozzles connected or connectable to a cooling liquid supply. The nozzles may be mounted to a suitable component, eg a bar, adapted to traverse the media bed. Thus, the bar may be provided with displacement means, such as an electric motor and lead screw arrangement, to enable it to be displaced to-and-fro across the media bed, eg on a continuous basis.

The separating media bed may be displaceable. Thus, the separating media bed may have an entry zone or portion at or through which contaminated gas/vapour enters the bed, and an exit zone or portion at or through which clean gas/vapour leave the bed. The apparatus may include a holder holding the separating media, the holder having opposed openings providing the entry and exit zones, and the openings being covered with apertured separating media retaining means, such as mesh. The holder may be displaceable about a rotational axis. The holder will thus be shaped to permit rotation thereof, and the vessel will have complementary seating components to match the holder and ensure that contaminated gas/vapour does not bypass the media bed.

The apparatus may include washing means for washing the separating media bed after displacement thereof. The washing means may include a washing liquid holding vessel; dosing means for dosing a washing chemical into the vessel; heating means for heating the washing liquid in the vessel; pump means for pumping hot chemically dosed washing liquid from the vessel through nozzles onto the separating media bed; collection means for collecting used washing liquid which has passed through the separating media bed, with the pump means also adapted to recycle the used washing liquid to the nozzles. The nozzles may thus be the cooling liquid nozzles. Instead of the pump means being used to pump hot washing liquid from the vessel, the vessel can be located above the nozzles, with the hot washing liquid then gravitating through the nozzles initially. As described hereinbefore, the washing liquid may, in particular, be water.

The thickness or depth of the separating media bed may be between 3 cm and 15 cm, typically between 5 cm and 12 cm. The curled separating media may each having a dimension or length of between 3 mm and 30 mm, eg 15 mm to 20 mm. By 'curled separating media' is meant separating media comprising strips shaped to have the form of at least a partial ringlet or spiral.

In one embodiment of the invention, the curled separating media may be wood shavings. However, in another embodiment of the invention, they may be metal shavings, eg aluminium or steel shavings.

The thickness of the shavings may be less than 1 mm and even less than 0.5 mm, eg about 0.1 mm, while the widths of the shavings may be between 1 mm and 10 mm, eg about 5 mm. The radius of curvature of the shavings may be between 2 mm and 15 mm, eg about 8 mm. The lengths of the metal strips obtained by straightening the shavings may be between 30 mm and 100 mm, eg between 40 mm and 60 mm. The shavings may thus be of spiral or ringlet form.

According to a third aspect of the invention, there is provided a cooking installation, which comprises
 cooking apparatus on which foodstuffs can be cooked;
 air collection means above the cooking apparatus for collecting oil and fat laden air generated by the cooking of foodstuffs on the cooking apparatus;
 an extraction conduit leading from the air collection means such that an inlet to the conduit is provided in the air collection means;
 air extraction means in or associated with the extraction conduit, for extracting air from the space between the air collection means and the cooking apparatus into the extraction conduit; and
 separating apparatus as hereinbefore described, mounted to the air collection means such that the outlet of the separating apparatus is in communication with the conduit inlet.

The cooking apparatus may, in particular, be adapted such that foodstuffs can be grilled thereon, eg by means of a gas flame.

The air collection means may comprise a hood or the like, while the conduit may be in the form of a duct. The extraction means may be an extraction fan mounted in the duct.

Apart from fat and oil laden air entering the separating apparatus, in use, cold air will also be drawn in from underneath the hood, with the cold air serving to condense the fats and oils from a gaseous form at a high temperature, typically about 170° C. immediately above the cooking apparatus, to a liquid form at a lower temperature, typically between ambient temperature and 100° C., eg 20° C.–70° C., at which temperature all oils and fats are in liquid form and at which temperature efficient separation thereof in the bed of curled separating media can be effected.

The invention will now be described by way of example with reference to the accompanying diagrammatic drawings.

DETAILED DESCRIPTION OF THE PREFERRED EMBODIMENTS

Figure 1:
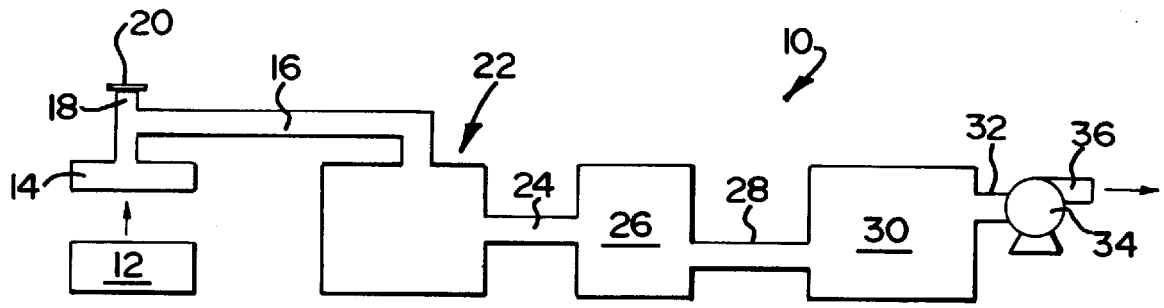
FIG. 1 shows a simplified flow diagram of a separation process according to the first aspect of the invention, and including separation apparatus according to a first embodiment of the second aspect of the invention.
Figure 2:
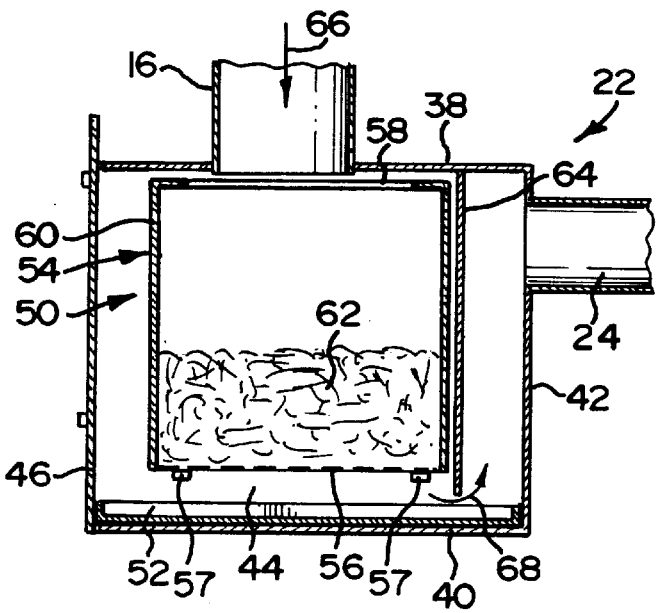
FIG. 2 shows an enlarged sectional view of the separation apparatus of FIG. 1.
Figure 3:
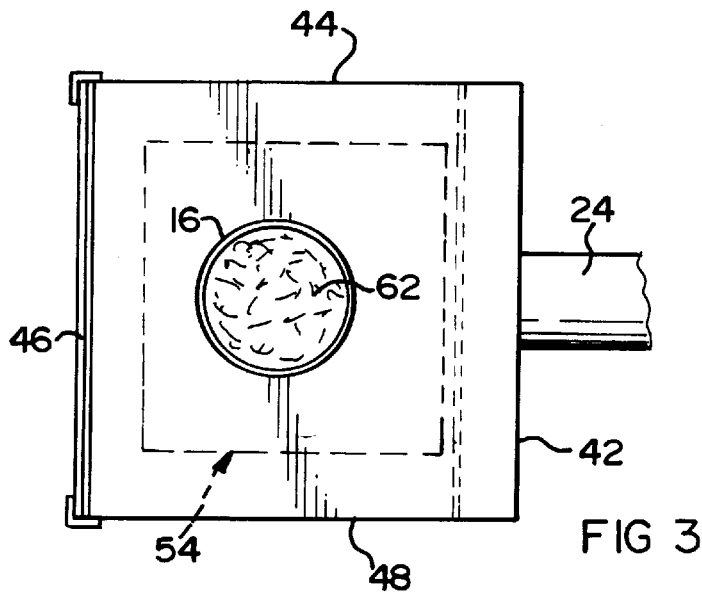
FIG. 3 shows an enlarged plan view of the separation apparatus of FIG. 1.

Referring to FIGS. 1 to 3, reference numeral 10 generally indicates a separation process according to the invention.

The process 10 includes a cooker 12, which includes heating means (not shown) for heating or cooking foodstuffs. A hood 14 is located above the cooker 12. A conduit 16 leads from the hood 14, and is provided with an open limb 18 closed off with a removable plate 20. The conduit 16 leads into the top of separation apparatus, generally indicated by reference numeral 22. A conduit 24 leads from a side of the apparatus 22 to a scrubber 26, with a conduit 28 leading from the scrubber 26 to a biological filter 30. A conduit 32 leads from the biological filter 30 to the suction side of a fan 34, with an air discharge conduit 36 leading from the fan 34 to atmosphere.

The separation apparatus 22 comprises a square roof 38, a square floor 40 spaced from the roof 38, and side walls 42, 44, 46 and 48 extending between the floor and roof. The conduit 24 thus leads from the wall 42, while the wall 46 is slidably attached to the walls 44, 48 so that it is removable, thereby providing access to a separation zone 50 provided inside the apparatus 22. A tray 52 is located on the floor 40, and is slidably removable from the separation zone 50 through the gap provided when the wall 46 is removed.

The apparatus 22 also includes a basket, generally indicated by reference number 54. The basket 54 has an apertured base 56, a top 58 which is spaced with limited clearance from the roof 38 and which has an opening which is aligned with the conduit 16, and side walls 60. A fixed bed 62 of curled separating media 70 is located in the basket 54, on top of the apertured base or grid 56. The basket is removable, being located on supports 57 protruding from the walls 44, 48.

Figure 4:
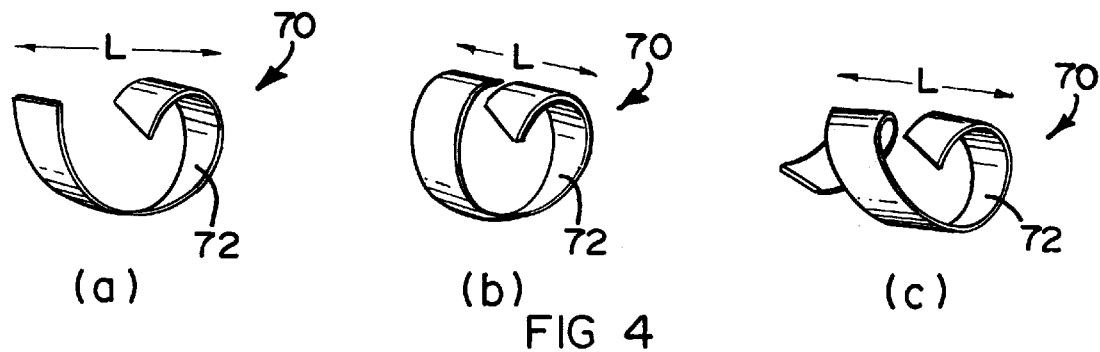
FIGS. 4(a), (b) and (c) show three-dimensional views of typical curled separating media used in the separating apparatus of FIGS. 1 to 3, and 5 to 15.

The curled separating media 70 are as hereinafter described with reference to FIG. 4.

A baffle 64 depends from the roof 38 and terminates with clearance from the floor 40. The baffle extends from the wall 44 to the wall 48.

In use, foodstuffs are cooked in the cooker 12. The foodstuffs release hot fats or oils, which can be in the form of liquid droplets or vaporized, into the air space above the cooker as they are cooked. These fats and oils are entrained or drawn up with air which is sucked in, by means of the fan or blower 34, into the hood 14. The fat and oil laden air passes along the conduit 16 and enters the separation apparatus 22 in a downward direction, as indicated by arrow 66. The fat and oil laden air thus passes along the conduit 16, and enters the top of the separation zone 50. In view of the enlarged cross-sectional area of the basket 54 as compared to that of the conduit 16, the velocity ($V_1$) of the air entering the basket and passing through the bed 62 drops. The air, still moving in a downward direction, encounters the curled separating media 70. The separating media 70, in view of their shape, provide contact surfaces against which the entrained fat and oil can impinge and be collected. Once sufficient or excess oil and fat have accumulated on the media 70, the oil and fat drip downwardly from the media 70 into the tray 52 under gravity. The substantially oil and fat free air passes into and through the portion of the separation zone 50 below the basket 54 at a still lower velocity ($V_2$). The air then passes, as indicated by arrow 68, into the space between the lower edge of the baffle 64 and the conduit 24, at a higher velocity, and then exits through the conduit 24 at a still higher velocity.

The separation apparatus 22 may be sized such that the following air velocities are attained therein:

$v_1$—0.5 to 1.5 m/sec
$v_2$—0.3 to 0.8 m/sec

The substantially oil and fat free air then passes into the scrubber 26 where ammonia is removed by scrubbing the air with water. The air then passes along the conduit 28 into the biological filter, where sulphurous compounds, such as mercaptans are removed, before being discharged into the air via the conduit 36.

EXAMPLE

The separation apparatus 22 was tested in a prototype installation, having the layout of the process 10.

In the prototype installation, the dimensions of the separation apparatus 22 were 40 cm×40 cm×40 cm. The size of the basket 54 was 30 cm×30 cm×30 cm. The diameter of the conduit 16 was 200 mm, while that of the conduit 24 was 140 mm. Instead of metal shavings, oak curls or shavings, having a maximum dimension of between 3 mm and 15 mm were used as curled separating media in the basket 54, and the depth of the bed 62 of oak curls was 12 cm.

A mixture of hard white animal fat and cooking oil was, in a simulation of an industrial cooker 12, heated to a temperature of 180° C. Water was added to the hot mixture of oil and fat, and allowed to boil or cook off. The ambient air temperature was 21° C. It was found that the outlet temperature of the cooker, ie the temperature of the air at the inlet to the hood 14, after the air had entrained the oil and fat, was in the region of 65° C. to 70° C.

The air velocities in the separation apparatus 22 were as follows:

$V_1$—1.3 m/sec
$V_2$—0.7 m/sec

It was found that only the bottom 3 cm of the 12 cm bed 62 of separating media became totally saturated with oil, with the upper 9 cm remaining relatively oil and fat free. Excess oil dripped into the tray 52. Visual inspection of the conduit 16, which was effected by removing the plate 20, showed that the conduit wall was extremely dirty and contaminated with oil and fat. In contrast, visual inspection of the conduit 24 showed it to be substantially clean, and oil and fat free. After 5 hours of simulating an industrial cooking process as described above, the conduit 24 was still substantially dry with no traces of fat or oil having deposited on its sides, as evidenced by rubbing the sides with a clean tissue.

After the cooking process had been stopped, the heat still present in the apparatus 22 enable substantially all the fat and oil to drip out of the separating media into the tray 52. After the apparatus had been allowed to cool down to below 10° C., it was found that there was only a pressure increase of 3.5 mm water column across the bed 62, as compared to the pressure drop across the unused bed before the test started. It was also determined that only 600 g of fat and oil had been absorbed into the wood curls.

As a variation of the test, 25% excess cool air was sucked in through the conduit 18. It was found that this decreased the temperature of the air in the conduit 24 by 15° C., without affecting the performance of the apparatus 22.

In a further test variation, after 5 hours of normal cooking as described above, the apparatus 22 was cooled down and then flooded with 2 liters of cold hard fat and 4 liters of oil which were introduced directly into the top of the bed of separating media. The air temperature through the apparatus 22 was then slowly increased to 40° C. for 15 minutes, and thereafter allowed to cool down to 18° C. It was found that the weight of the fat and oil retained in the separating media, and the pressure drop across the bed remained the same as above, indicating that the media had reached saturation point and that the additional fats and oils were merely knocked out and collected in the tray 52.

The Applicant believes that the apparatus 22 provides an effective means of removing fats and oils from air, such as oil and fat laden air from an industrial cooker.

Referring to FIGS. 4(a), (b) and (c), reference numeral 70 generally indicates individual curled separating media used in the separating apparatus of FIGS. 1 to 3 and 5 to 15.

Each curled separating medium 70 is in the form of a metal shaving 72 having a length 'L' of about 15 mm to about 25 mm. The shavings 72 each have a thickness of about 0.1 mm, a width of about 6 mm and, when straightened, a length of about 40 mm to about 60 mm. Naturally, these dimensions will not be the same for all shavings in the bed, but will normally vary from shaving to shaving. Thus, typically, the length 'L' can vary between 5 mm and 25 mm while the width can vary between 2 mm and 8 mm. The straightened length can vary between 30 mm and 100 mm. The radii of curvature of the loops of the shaving 72 are about 5 mm to 10 mm, but can vary, typically between 2 mm and 15 mm. The shavings 72 are thus in the form of spirals or ringlets.

The metal shavings may be of aluminium or steel. Instead, however, the separating media may be of wood, eg may be in the form of wood curls, such as oak curls. Still further, the separating media may instead by of plastics material, ceramic, or the like.

Figure 5:
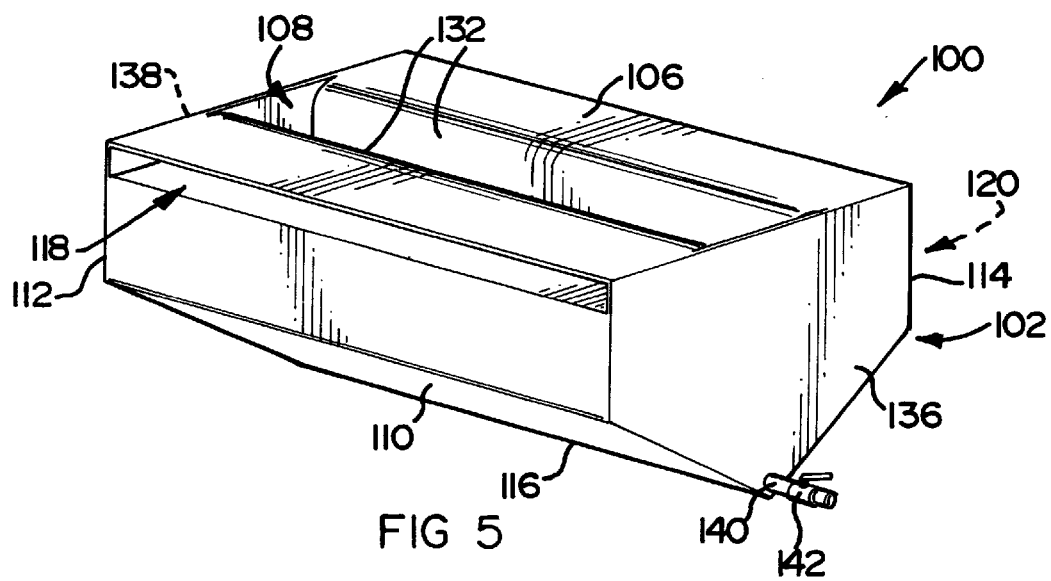
FIG. 5 shows a three-dimensional view of separating apparatus according to a second embodiment of the second aspect of the invention.
Figure 6:
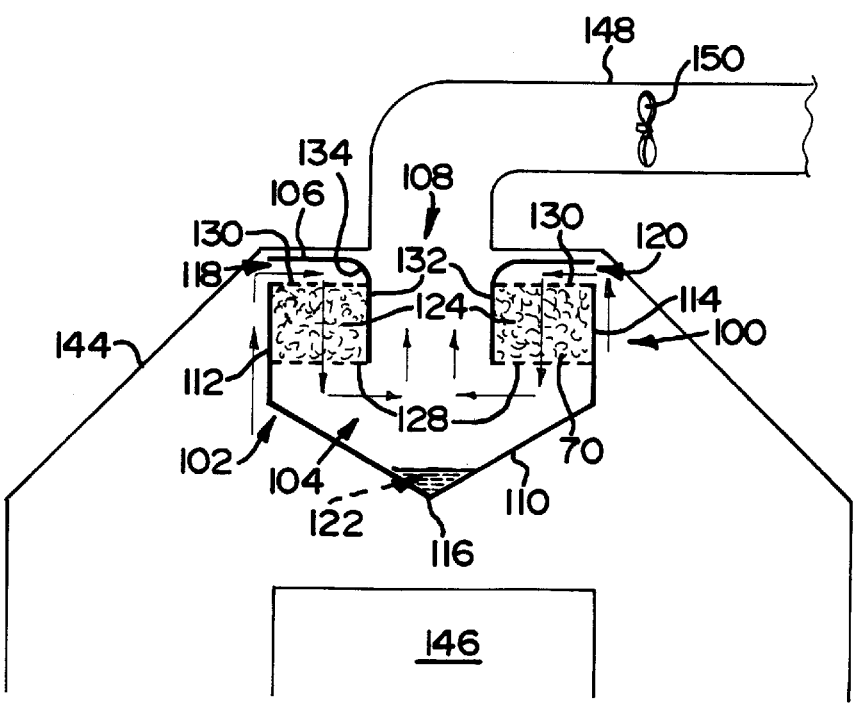
FIG. 6 shows a cross-sectional view of a cooking installation incorporating the separating apparatus of FIG. 5.

Referring to FIGS. 5 and 6, reference numeral 100 generally indicates separation apparatus according to a second embodiment of the second aspect of the invention.

The separation apparatus 100 includes a vessel, generally indicated by reference numeral 102, providing a separation zone, generally indicated by reference numeral 104.

The vessel 102 comprises a roof 106 which is rectangular in plan view and has therein an air outlet 108 extending along the full length of the roof. The vessel 102 also includes a V-shaped floor 110, with a pair of spaced parallel wall panels 112, 114 located between the roof 106 and the floor 110 such that the floor 110 tapers downwardly inwardly from the wall panels 112, 114. Thus, an apex 116 of the floor 110 extends parallel to the air outlet 108 in the roof 106. An air inlet 118 is provided in the wall panel 112 at a relatively high level adjacent the roof 106, with the air inlet 118 extending the full length of the wall panel 112. A similar air inlet 120 is provided in the wall panel 114.

A fat/oil collection zone 122 is provided at the apex of the floor 110.

A bed 124 of the curled separating media 70 is associated with each of the air inlets 118, 120, with the beds 124 being located inside the separation zone 104. Each bed 124 rests on a apertured support 128, which may be a piece of mesh or the like, while a further apertured support 130 is located on top of the beds 124 to hold the curled separating media 70 in position. Typically, the beds 124 are about 12 cm deep, but can be shallower if desired, eg about 5 cm deep.

The beds 124 are located between the wall panels 112, 114 and inner panels 132 depending downwardly from the roof 106. The roof 106 and panels 132 are arranged such that they provide curved air deflecting surfaces 134 which serve to deflect entering through the air inlets 118, 120 downwardly through the beds 124.

The vessel 102 also comprises end panels 136, 138 closing off the respective ends of the roof 106, walls 112, 114 and floor 110. An oil drainage tube 140 protrudes from the end panel 136 and is provided with a stopcock 142. The tube 140 is thus in communication with the zone 122, and oil and fat which has collected in the zone 122 can be drained therefrom through the tube 140.

In use, the separating apparatus 100 is used with a cooking hood 144 which is located with clearance over a cooking apparatus 146, such as a gas fired stove. The roof 106 of the separating apparatus 100 is attached to the hood 144 such that the air outlet 108 is located opposite the inlet to a duct 148 leading from the hood. An extraction fan 150 is located in the duct 148.

As foodstuffs, such as bits of chicken (not shown) are grilled on the stove 146, oil and fat laden hot air is generated above the stove 146. The hot air rises upwardly, assisted by the suction generated by the extraction fan 150. The hot fat and oil laden air, which is typically at a temperature of about 170° C. immediately above the stove 146, is cooled as it passes upwardly from the stove 146 to the separating apparatus 100 since it is mixed with cold air drawn in underneath the hood. Thus, the air is cooled down to a temperature typically in the region of 30° C.–40° C. by the time it enters the air inlets 118, 120 of the separating apparatus 100. The air then passes downwardly through the beds 124 where, due to the curved surfaces of the separating media 70, the reduction of the air speeds and the reduction in temperature, the fats and oils are separated from the air. The fats and oils collect on the curved surfaces of the media, and are then blown down into the collection zone 122 from where they can periodically be removed by means of the tube 140 and stopcock 142.

The curved surfaces 134 serve to deflect the air into the beds 124, thereby enhancing separation efficiency.

Cleaned air leaving the bottom of the beds 124 passes upwardly between the space between the plates 132 into the duct 148 from where it is discharged.

The various components of the apparatus are sized such that the velocity at which the fat and oil laden air enters the inlets 118, 120 is in the region of 4 m/sec. The air velocity immediately decreases, and the air passes through the beds 124 at a velocity of about 2.5 m/sec. The dimension of the gap between the plates 132 is such that the velocity, $V_2$, of the air passing therethrough is in the region of 1 m/sec or less.

The Applicant has found that, apart from the beds 124 serving to separate fats and oils efficiently from the air, they also act as flame arresters, with flames which enter the inlets 118, 120, eg as could happen if an abnormal situation occurs while using the stove 146, being arrested by the beds 124 and hindered from reaching the zone 122. The Applicant has also found that the separating media 70 are essentially self-cleaning since all oil and fat which collect thereon are forced downward by gravity and the air flow into the zone 122 with no cleaning of the media being required. This is evidenced by the fact that, even after prolonged operation, tests have indicated that the pressure drop through the beds 124 remains consistently low, typically at a value of about 1.5 mm water gauge, indicating that there is no build-up of oils or fats on the separating media.

Figure 7:
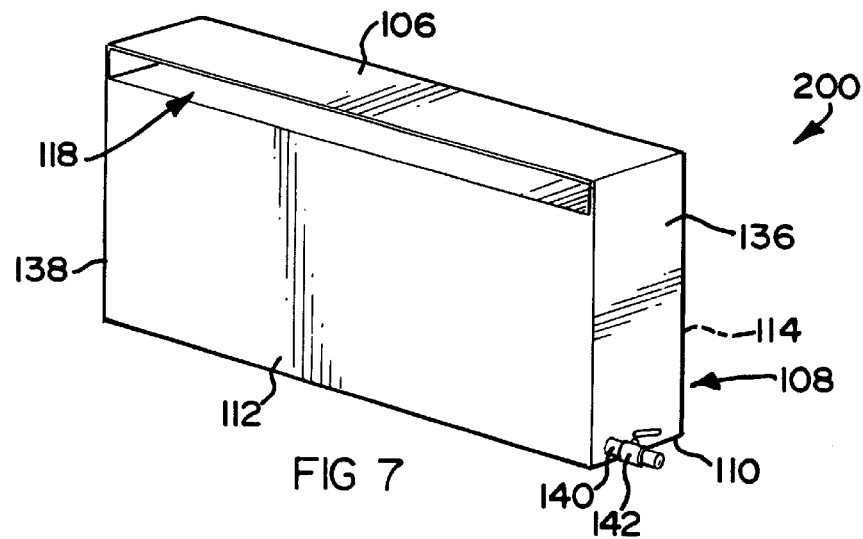
FIG. 7 shows a three-dimensional view of separating apparatus according to a third embodiment of the second aspect of the invention.
Figure 8:
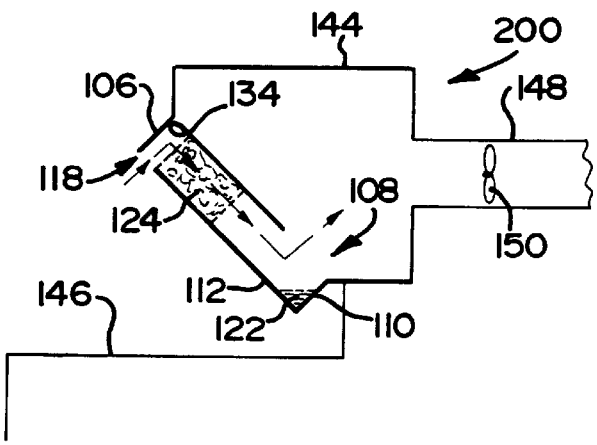
FIG. 8 shows a cross-sectional view of a cooking installation incorporating the separating apparatus of FIG. 7.

Referring to FIGS. 7 and 8, reference numeral 200 generally indicates separation apparatus according to a third embodiment of the second aspect of the invention.

Parts of the apparatus 200 which are the same or similar to the apparatus 100 shown in FIGS. 5 and 6, are indicated with the same reference numerals.

The apparatus 200 is similar to the apparatus 100, save that only a single bed 124 of separating media is provided. Thus, only the air inlet 118 is provided with no air inlet being provided in the wall panel 114. Instead, however, the air outlet 108 is provided in the wall panel 114.

The separating apparatus 200 functions in substantially the same fashion as the separating apparatus 100.

Figure 9:
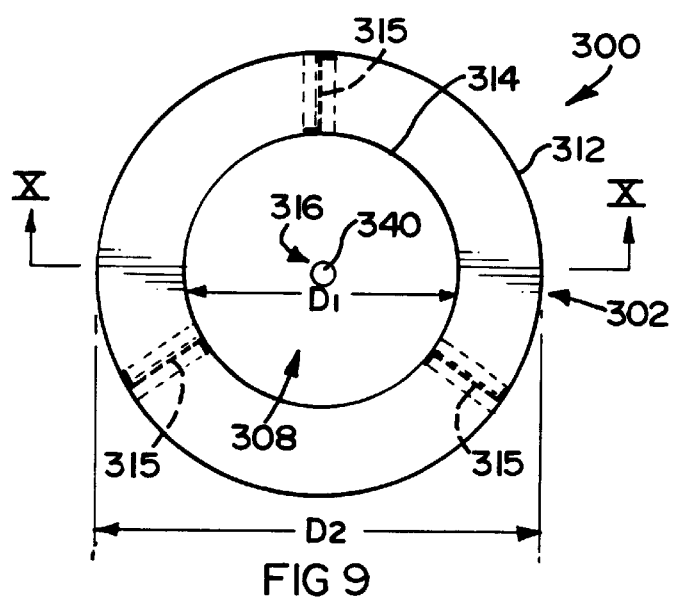
FIG. 9 shows a plan view of a separating apparatus in accordance with a fourth embodiment of the second aspect of the invention.
Figure 10:
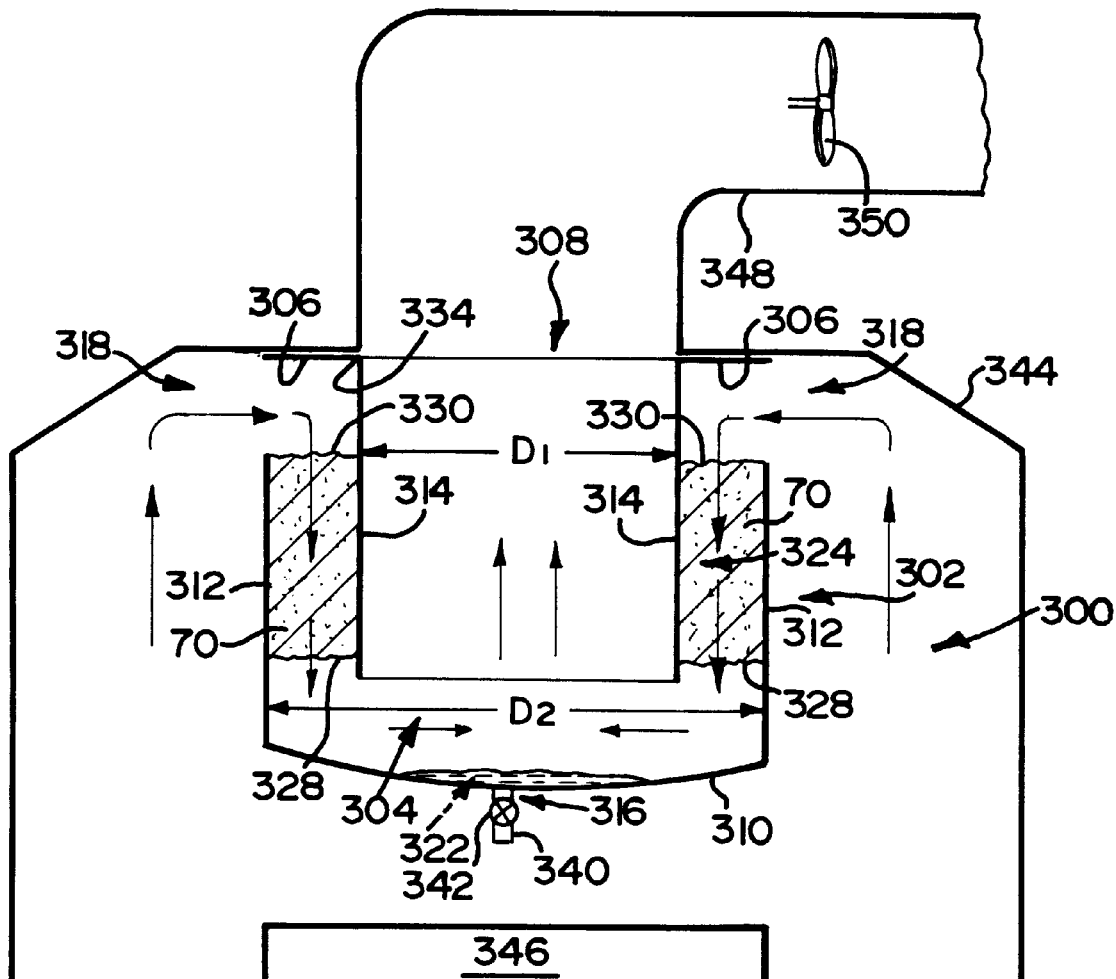
FIG. 10 shows a cross-sectional view through X—X of the separating apparatus of FIG. 9.

In FIGS. 9 and 10, reference numeral 300 generally indicates separation apparatus according to a fourth embodiment of the second aspect of the invention.

The separation apparatus 300 includes a cylindrical vessel, generally indicated by reference numeral 302, providing a separation zone 304.

The vessel 302 includes a concave-shaped or dish-shaped floor 310, with a cylindrical wall 312 protruding upwardly therefrom. The wall 312 is circular in cross-section.

A cylindrical component 314 is located centrally within the vessel 302 such that its lower end is spaced from the floor 310, while its upper end protrudes beyond the upper end of the wall 312. A circumferential flange 306 protrudes outwardly from the upper end of the component 314. The component 314 thus provides a central circular air outlet 308.

The wall 312 is thus, in essence, an outer wall, while the component 314 constitutes an inner wall.

The inner wall 314 typically has a diameter "$D_1$", of about 300 mm and the outer wall 312 typically has a diameter "$D_2$" of about 500 mm. The outer and inner walls 312, 314 typically have a wall thickness of approximately 0.7 mm.

Brackets 315 are provided to space and connect the outer wall 312 to the inner wall 314 as shown in FIG. 10.

The floor 310 thus curves downwardly inwardly from the outer wall 312 towards a lowermost centre point 316 of the floor 310 as shown, In other words, the centre point 316 of the floor 310 is at the lowermost point of the vessel 302 in use. A fat/oil collection zone 322 is provided adjacent the floor 310. The vessel 302 also includes an oil drainage pipe 340 protruding from the centre point 316 of the floor 310 with the oil drainage pipe 340 being provided with a stopcock 342.

A circumferentially extending air inlet 318 is provided between the upper end of the outer wall 312 and the flange 306.

A cylindrical bed 324 of the curled separating media 70 is located inside the separating zone 304 and extends circumferentially around the inner wall 314 between the inner wall 314 and the outer wall 312 as illustrated. The bed 324 rests on an annular apertured support 328, eg a piece of mesh or the like, while a further annular apertured support 330 is located on top of the bed 324 to hold the curled separating media 70 in position. Typically, the bed 324 is about 12 cm deep.

The flange 306 and the inner wall 314 are arranged at right angles to each other such that they provide air deflecting surfaces 334 which serve to deflect air entering through the air inlet 318 downwardly through the bed 324.

In use, the separating apparatus 300 is used with a cooking hood 344 which is located with clearance over a cooking apparatus 346, such as a gas fired stove. The flange 306 of the separating apparatus 300 is attached to the hood 344 such that the air outlet 308 is located opposite an inlet of a duct 348 leading from the hood 344. An extraction fan 350 is located in the duct 348.

The apparatus 300 functions in substantially the same manner as the apparatus 100, 200.

Figure 11:
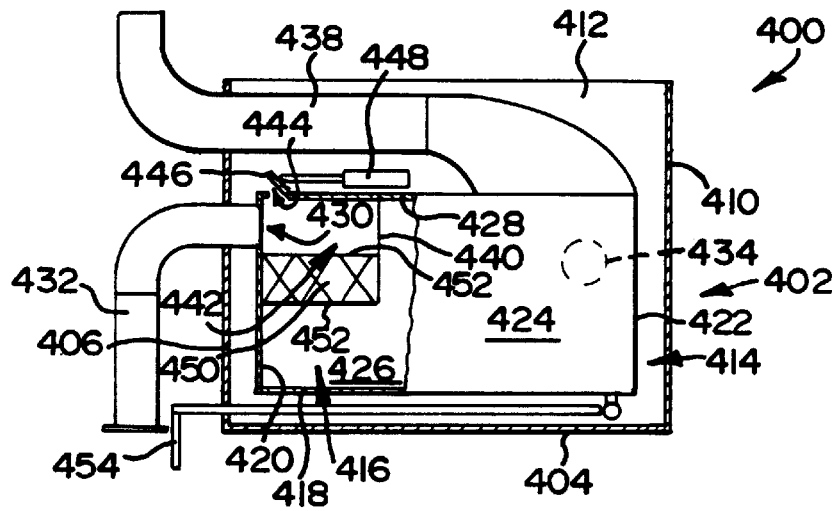
FIG. 11 shows a sectional view through XI—XI of separating apparatus according to a fifth embodiment of the second aspect of the invention, with some details omitted for clarity.
Figure 12:
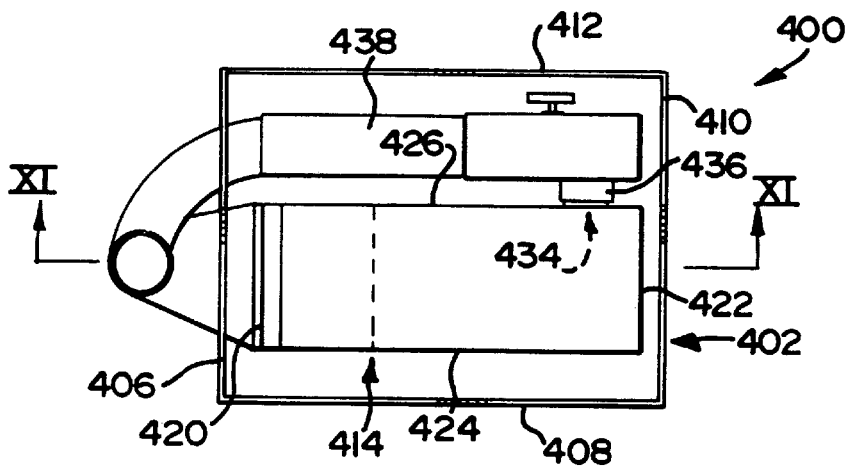
FIG. 12 shows a plan view of the separating apparatus of FIG. 11, with some details omitted for clarity.
Figure 13:
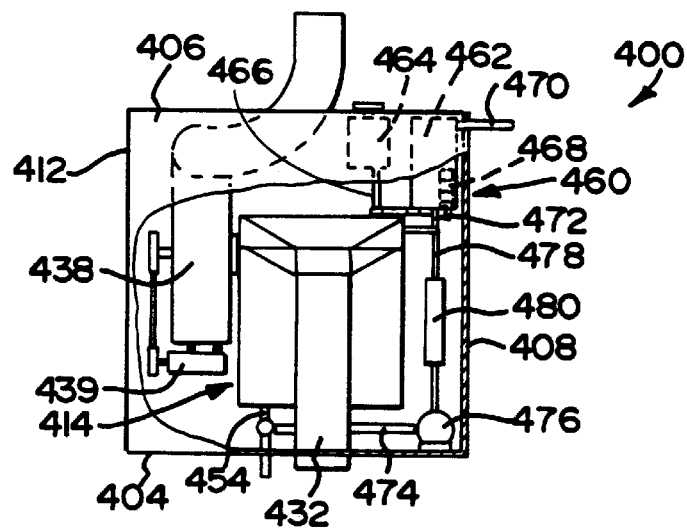
FIG. 13 shows a part cut-away end view of the separating apparatus of FIG. 11.

Referring to FIGS. 11 to 13, reference numeral 400 generally indicates separating apparatus according to a fifth embodiment of the second aspect of the invention.

The separating apparatus 400 includes a chamber, generally indicated by reference numeral 402. The chamber comprises a rectangular base 404 and sides 406, 408, 410 and 412 protruding upwardly from the base 404. The sides 406, 410 are opposed to each other, while the sides 408, 412 are opposed to each other.

The chamber 402 houses a vessel, generally indicated by reference numeral 414, providing an enclosed separation zone 416. The vessel 414 comprises a rectangular base 418, a front wall 420, a rear wall 422, and opposed side walls 424, 426. A roof 428 closes off the upper ends of the walls 420, 422, 424 and 426.

A contaminated air inlet, generally indicated by reference numeral 430, is provided in the front wall 420 of the vessel 414, with an air duct 432 connected to the inlet 430.

An air outlet 434 is provided in the side wall or panel 426, with a conduit 436 leading from around the air outlet 434 to air discharge ducting 438, fitted with an electrically operable ventilator or extraction fan 439.

Partitioning 440 is provided inside the separation zone 416 so that an air chamber 442 is defined adjacent the air inlet 430. An atmospheric or coolant air inlet 444 is provided in the roof 428, within the air chamber 442, so as to permit atmospheric or coolant air to enter the air chamber 412. A closure in the form of a pivotal flap 446 is provided, for regulating the effective size of the inlet or opening 444, and hence the volume of coolant air which passes therethrough. The positioning of the flap 446 is controlled or regulated by means of an electric motor/lead screw arrangement 448.

A bed 450 of the curled separating media 70 is provided below the air chamber 442 such that all air entering the air chamber 442 has to pass downwardly through the bed 450. The bed 450 is sandwiched between meshes 452 which hold the separating media 70 in place.

The relative dimensions of the air inlet 430 and the air chamber 442 are such that the reduction in the air velocity as the air enters the air chamber, takes place. The air velocity, $V_1$, through the bed 450 can thus be between 2 and 10 m/s, while the air velocity ($V_2$) in the separation zone 416 below the bed is less than 2 m/s. The thickness or depth of the bed 450 is typically in the range 5 cm to 12 cm.

An oil outlet or drain is provided in the floor 418, with a drainage pipe 454 leading therefrom.

The apparatus 400 also includes washing means, generally indicated by reference numeral 460, for washing the bed 450 of curled separating media. The washing means 460 includes a water vessel or tank 462; a washing chemical, eg detergent, holding tank 464 connected to the tank 462 by means of a conduit 466; an electrically operable heating element 468 inside the tank 462; a cold water conduit 470 leading into the tank 462; and a discharge conduit 472 leading from the bottom of the tank 462. The conduit 472 leads to spray nozzles (not shown) located above the bed 450. A conduit 474 leads from the drain conduit 454 to the suction side of a pump 476, with a conduit 478, fitted with an electrically operable heater 480, leading from the pump discharge to the conduit 472.

Suitable valves (not shown) are provided in the various conduits for effecting the washing operation as hereinafter described. These valves, as well as the electric motor 448 and the pump 476 may be linked to an automatic controller, eg an electronic processor, so that operation of the apparatus 400 is effected automatically.

In use, hot air contaminated with undesired condensible vaporized fat and oil, such as that emanating from an industrial cooker, eg a potato chips cooker, enters the air chamber 442 through the air ducting 432. This air stream is typically at a temperature of about 87° C. This air is admixed with cooler atmospheric or coolant air entering through the inlet 444 and regulated to have a temperature of about 41° C. at which the fat and oil are in condensed, ie liquid, form. The flap 446 can be used to regulate the amount of cooler atmospheric or coolant air entering the air chamber 442.

The cooler mixed air stream thus formed passes downwardly through the bed 450 of curled separating media, with the curled separating media serving to remove fats and oils from the air. Purified air passes through the bottom of the bed, into the separating chamber 416 and out through the air outlet 434 to be discharged through the air ducting 438.

Fats and oils drip from the bottom of the bed 450, run along the floor 418 and are discharged through the drain pipe 454.

Periodically, eg when the pressure drop through the bed 60 becomes excessive, eg greater than 50 kPa, or otherwise merely on a regular basis, when there is sufficient oil and fat build-up on the separating media, a washing cycle using the washing means 460 is activated. This can be effected automatically by suitable pressure differential control means (not shown) or other control means. On actuation, cold water enters the water tank 460 through the conduit 470. Sufficient detergent or other washing chemical is transferred from the vessel 464 into the tank 462. Thereafter the tank 462 is heated to a desired temperature at which efficient washing of the media can take place. The hot detergent containing water gravitates from the tank 462 through the washing nozzles, thereby being sprayed onto the bed 450. The water washes the bed 450 as it passes through it, and the contaminated water is collected on the floor 418. The water flows to the oil discharge point and, by means of valves in the conduits 454, 474, is then recirculated by means of the conduit 474, the pump 476 and the conduit 478, with the water being reheated in the heater 480. Once the water has been recycled in this fashion for a desired length of time to complete a washing cycle, the pump 476 is deactivated and the water discharged through the drain pipe 454.

It will be appreciated that while the washing cycle is taking place, contaminated air continues to pass through the bed 450 at the same time.

Figure 14:
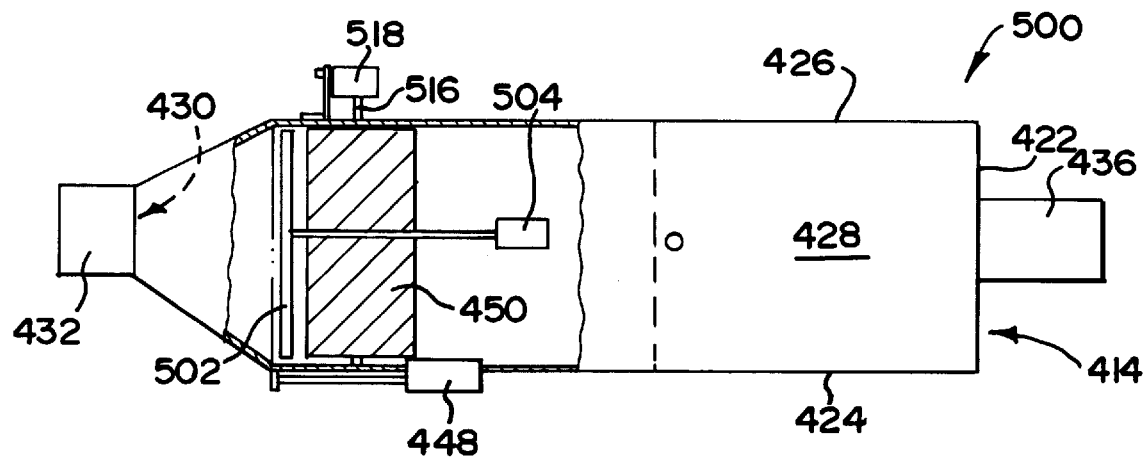
FIG. 14 shows a part cut-away plan view of separating apparatus according to a sixth embodiment of the second aspect of the invention, with some details omitted for clarity.
Figure 15:
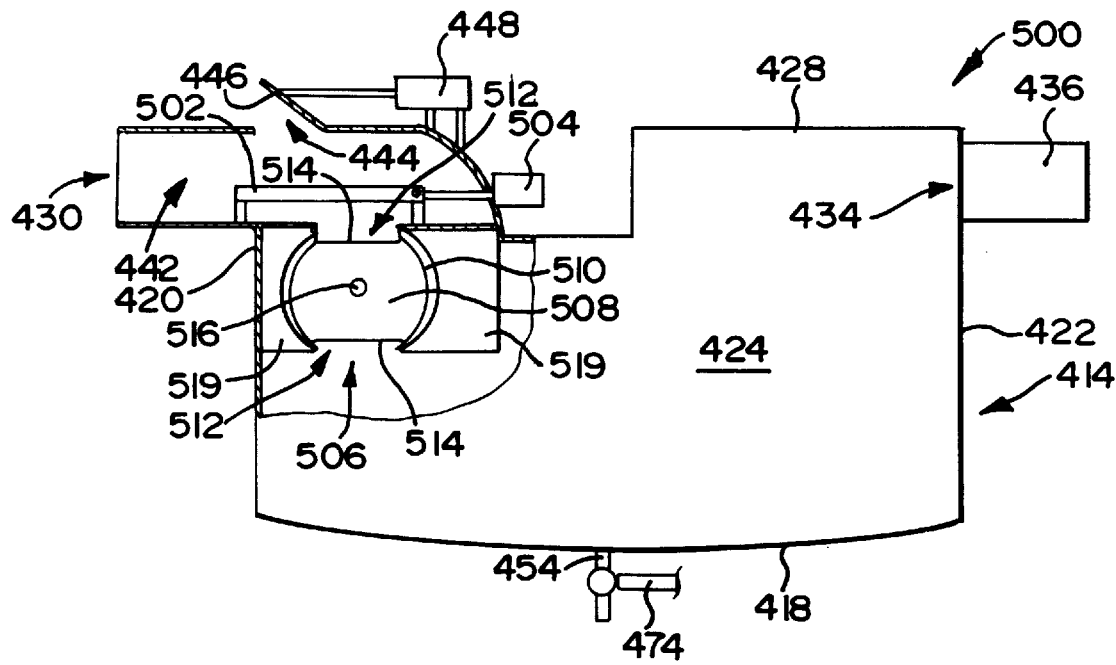
FIG. 15 shows a part cut-away side view of the separating apparatus of FIG. 14, with some details omitted for clarity.

Referring to FIGS. 14 and 15, reference numeral 500 generally indicates separating apparatus according to a sixth embodiment of the second aspect of the invention.

Parts of the apparatus 500 which are the same or similar to those of the apparatus 400 hereinbefore described with reference to FIGS. 11 to 13, are indicated with the same reference numerals.

While this is not shown, it is to be appreciated that the apparatus 500 also includes washing means 460, as hereinbefore described.

In the apparatus 500, the spray nozzles for spraying the hot water onto the bed of separating media are mounted to a transverse spray bar 502 which is displaceable across the bed of separating media by means of an electric motor and lead screw arrangement 504.

In the apparatus 500, the bed 450 is contained within a holder, generally indicated by reference numeral 506. The holder 506 comprises end plates 508, and opposed side plates 510 extending between the end plates such that opposed openings 512 are provided between the side plates 510. The side plates 510 are curved. The bed 450 is thus contained between the end plates 508 and the side plates 510 and are retained in position by pieces of mesh 514 which span the openings 512. The holder 506 is provided with an axle 516, connected to an electric motor 518 to permit rotation of the holder 514 through 180° so that either of the openings 512 can be upwardly directed.

The vessel 414 includes components 519 having seats which are complementary to the sides 510 of the holder 514. This is to ensure that contaminated air does not bypass the bed contained in the holder 514.

In use, the apparatus 500 functions in similar fashion to the apparatus 400 hereinbefore described. However, the apparatus 500 can be used with a contaminated air stream also containing solid matter to be removed therefrom. This solid matter is thus also trapped in the bed 450. When the pressure drop across the bed 450 is sufficiently high, eg greater than 50 kPa, it is automatically rotated through 180° so that the upper portion of the bed which is contaminated with solid matter, is then located at the bottom. The force of the air passing through the bed will then assist in dislodging the solid matter which will thus also collect on the floor 418. Additionally, the pulse of air which the upper side of the bed experiences as it is rotated, bearing in mind that while one of the side members 510 spans the air outlet of the air chamber, no flow through the bed takes place, also serves to dislodge solids in a shock fashion.

After the bed has been rotated through 180°, it is subjected to a wash cycle, as hereinbefore described with reference to the apparatus 400.

It is to be appreciated that, in the apparatus 500, the nozzles mounted on the spray bar 502 can also be used to inject clean water into the space above the bed during normal passage of air therethrough, to serve as additional cooling medium for cooling down the air. Typically, such cooling water spray will be actuated once the flap 446 has been opened to its maximum so that the maximum amount of cooling air enters the chamber 52. Typically, when the flap 446 is about 55% open, the spray of cooling water will be actuated.

During the wash cycle, the setting of the flap 446 can be controlled so that the temperature of the air as it passes through the bed is somewhat higher than its normal operating temperature, eg about 60° C. as compared to the normal operating temperature of about 41° C., to enhance cleaning of the separating media of the bed.

I claim:

1. A separation process, which comprises passing a gas or vapour stream contaminated with an undesired substance or contaminant downwardly through a bed of curled separating media located in a separation zone having a gas/vapour inlet and a gas/vapour outlet, with the bed positioned between the inlet and the outlet such that the velocity of the gas or vapour steam through the bed is lower than the velocity of the gas or vapour steam through the gas/vapour inlet;

allowing the undesired substance or contaminant to separate from the gas or vapour as it passes through the bed;

withdrawing purified gas or vapour from the bed and allowing it to pass into and through a portion of the separation zone at a velocity which is lower than the velocity of the gas or vapour stream through the bed;

allowing excess undesired substance or contaminant to drip from the separating media; and catching this excess undesired substance or contaminant at the bottom of the separation zone.

2. A process according to claim 1, which includes, when the pressure drop through the media bed becomes excessive due to contamination of the media and/or solids build-up in the bed, displacing the bed so that the gas or vapour stream enters a different zone of the bed, the bed having an entry zone or portion through which the contaminated gas or vapour stream enters the bed and an exit zone or portion through which the purified gas or vapour stream leaves the bed, with the zones being located on opposite sides of a rotational axis, and with the displacement of the bed being through 180° and being effected by rotating it about the axis so that the entry zone becomes the exit zone and the exit zone becomes the entry zone.

3. A process according to claim 1, wherein the contaminated gas or vapour stream is an off or waste gas stream emanating from a household, commercial or industrial cooker, with the contaminant or undesired substance being fat and/or oil.

4. A separation apparatus, which comprises a vessel defining a separation zone;

a contaminated gas/vapour inlet leading into the vessel;

a gas/vapour outlet leading from the vessel;

separating means comprising a bed of curled separating media in the separation zone, the inlet, the separating means and the outlet arranged such that a contaminated gas or vapour stream entering the separation zone through the inlet passes downwardly through the bed, into and through a portion of the separation zone below the bed, and exits the zone through the outlet, with the curled separating media acting to separate contaminants from the gas or vapour as the gas or vapour stream passes through the bed, with the bed being of larger cross-sectional area than the inlet so that the velocity of the gas or vapour stream through the bed is lower than the velocity of the gas or vapour stream through the gas/vapour inlet, and with the portion of the separation zone below the bed being dimensioned so that the velocity of the gas or vapour through that portion of the separation zone is lower than the velocity of the gas or vapour stream through the bed; and a contaminant collection zone inside the vessel below the bed of curled separating media so that excess contaminant can drip from the separating media and be caught in the contaminant collection zone.

5. An apparatus according to claim 4, wherein the vessel has a base or floor, a roof spaced from the base, and a peripheral wall between the base and the roof, with the inlet being provided in the roof, and the outlet being provided in the wall.

6. An apparatus according to claim 5, wherein the contaminant collection zone is adjacent the floor such that it is spaced from the bed of curled separating media, with the inlet being provided in the wall at a high level, and the outlet being provided in the wall and/or in the roof such that it is in communication with the space between the bed of curled separating media and contaminant collection zone.

7. An apparatus according to claim 6, wherein (i) the floor and roof is square or rectangular in plan view, with the wall thus comprising four wall panels connecting the floor and the roof, the inlet being provided in one wall panel at said high level and the outlet being provided in an opposing wall panel at a lower level; or (ii) the floor and roof is square or rectangular in plan view, so that the wall comprises four wall panels connecting the floor and the roof, one of the inlets being provided in each of two opposing wall panels, with one of the beds of the curled separating media being provided for each inlet, and with a common outlet being provided in the roof, the floor being of V-shape in cross-section, tapering downwardly inwardly from the wall panels having the inlets and with the contaminant collection zone being provided at or along the apex of the floor.

8. An apparatus according to claim 5, wherein the contaminant collection zone is adjacent the floor such that it is spaced from the bed of curled separating media, with the inlet leading into the vessel at a high level, and with the outlet being located centrally so that the bed of curled separating media is located around the outlet.

9. An apparatus according to claim 5, wherein the separating media bed is displaceable, the separating media bed having an entry zone or portion at or through which contaminated gas/vapour enters the bed, and an exit zone or portion at or through which clean gas/vapour leave the bed, with the apparatus including a holder holding the separating media, the holder having opposed openings providing the entry and exit zones, the openings being covered with apertured separating media retaining means.

10. An apparatus according to claim 5, wherein the thickness of the separating media bed is between 3 cm and 15 cm, with the curled separating media each having a dimension or length of between 3 mm and 30 mm.

11. An apparatus according to claim 10, wherein the curled separating media are metal shavings, the thickness of the shavings being less than 1 mm while the widths of the shavings are between 1 mm and 10 mm, the radius of curvature of the shavings being between 2 mm and 15 mm, and the shavings being of spiral or ringlet form.

\* \* \* \* \*